United States Patent [19]
Gardos et al.

[11] Patent Number: 5,816,445
[45] Date of Patent: Oct. 6, 1998

[54] METHOD OF AND APPARATUS FOR CONTROLLED DISPENSING OF TWO-PART BONDING, CASTING AND SIMILAR FLUIDS AND THE LIKE

[75] Inventors: Ivan Gardos, Screwsbury; Ivan Faigen, Wayland, both of Mass.

[73] Assignee: Stainless Steel Coatings, Inc., Lancaster, Mass.

[21] Appl. No.: 590,389

[22] Filed: Jan. 25, 1996

[51] Int. Cl.[6] .................................................. B67D 5/52
[52] U.S. Cl. ................. 222/1; 222/63; 222/137; 222/145.6; 222/214; 222/334; 222/389; 222/504
[58] Field of Search ............................ 222/137, 1, 389, 222/334, 145.6, 183, 326, 327, 95, 105, 94, 214, 504, 63, 212

[56] References Cited

U.S. PATENT DOCUMENTS

| | | | |
|---|---|---|---|
| 3,237,814 | 3/1966 | Collar | 222/389 X |
| 4,030,640 | 6/1977 | Citrin et al. | 222/214 X |
| 4,067,479 | 1/1978 | Moline | 222/137 X |
| 5,020,693 | 6/1991 | Ernst et al. | 222/137 |
| 5,184,758 | 2/1993 | Keller | 222/137 |
| 5,224,629 | 7/1993 | Hsich | 222/137 |
| 5,332,122 | 7/1994 | Herold et al. | 222/105 |
| 5,441,175 | 8/1995 | Jacobsen et al. | 222/137 |

*Primary Examiner*—Kevin P. Shaver
*Attorney, Agent, or Firm*—Rines and Rines

[57] ABSTRACT

A novel two-part fluid dispensing and technique using fluids of similar or widely different viscosities and in flexible plastic or similar cartridges of a similar or different volumes, and with adjustable dispensing ratios by forcing the fluids out of their respective cartridges in response to variable air pressure into a static mixer, and thence along a dispensing flexible pinch tube, the opening and closing of which is controlled by a pinch valve operated in response either to manual or micro-processor-controlled control.

22 Claims, 2 Drawing Sheets ns of the cartridges, later described. The push pads 17 and 19 may also serve as the piston heads where the cartridges are not provided with their own plungers.

METHOD OF AND APPARATUS FOR CONTROLLED DISPENSING OF TWO-PART BONDING, CASTING AND SIMILAR FLUIDS AND THE LIKE

The present invention relates to dispensers or guns for mixing and dispensing two-part or—component bonding, casting and similar resins, such as epoxies using catalysts silicones, polyurethanes and the like, sealants, adhesives and other compounds, all hereinafter referred to generically as "fluids"; being more particularly directed to pre-loaded fluid-filled cartridges, often containing fluids of widely varying viscosities and other properties, and to their accurate and programmable controlled dispensing.

BACKGROUND

Prior two-part fluid dispensers of this character have inherently operated with dispensing problems and limitations, including requirements for expensive bulk meter mix dispensing apparatus (MMD) that demands costly cleanup and maintenance procedures and involves operator exposure to toxins in the fluids, and with conventional two-part fluid cartridge dispenser systems lacking sufficient accuracy for controlled applications. In addition, such cartridge systems are subject to cartridge and/or piston deformation in use; and, with their monitoring of the air volume required to dispense, have shot size affected by variation in air pressure, fluid viscosities and humidity, among other factors. They are not adapted, furthermore, for two-part fluids of widely different viscosities and for widely variable ratio mixing and dispensing cartridge arrays. Prior apparatus of this type, moreover, are frequently subject to lead/lag, oozing, drooling or dripping difficulties causing users often to continue with manual mixing and dispensing operations despite their poor reliability, high labor costs, waste, and personnel exposure to materials and solvents.

Among the major inherent problems with prior cartridge systems is the fact that especially when dealing with ratios other than 1:1, the viscosities of the resin and the catalyst are very far apart. Almost always, the catalyst viscosity is close to water, while the resin can be like molasses or even thick paste. This has two effects. Because the resin is thicker, the pressures in the resin cartridge is much higher. The cartridges are constructed out of plastic with thin walls and may be of different diameters. The required dispensing pressures cause a very significant expansion of the cartridge diameters, and because of the difference of viscosities in the two materials, as well as the difference in cartridge sizes, the cartridges expand differently, creating an error in the dispensing ratio which often exceeds the normally allowed tolerances; for urethanes, for example, of the order of about 2%.

A second major problem is the inequality of the dispensing forces required by the two parts due to the mismatch in viscosity. This puts a severe bending stress on the dispensing mechanism resulting in faster feeding of one part then the other. This is known as the lead/lag effect. Prior to the present invention, the mechanisms that are available do not have the required rigidity to overcome this problem.

The present invention is directed to obviating significantly the above-described limitations and difficulties through a novel combination of the accuracy of bulk MMD procedures through the use of static mixers with vastly improved low-cost cartridge dispenser apparatus.

OBJECTS OF INVENTION

The principal object of the invention, accordingly, is to provide a new and improved two-fluid cartridge dispensing system and method, remarkably void of prior art problems and limitations, including those above described, and that enable low-cost, low maintenance, increased productivity and small foot-print disposable cartridge operation, adapted for both low and high viscosity and even widely different viscosity fluid materials, including highly reactive or abrasive systems, and particularly adapted for semi-automatic and computer-controlled highly accurate dispensing, with a wide selectable and adjustable range of mixing and dispensing ratios.

A further object is to provide such a new system and technique that have increased reliability and reduced waste, and of such relatively small size as to be readily integrated into production lines or other limited spaces, and easily programmable and simple to operate.

Still a further object is to provide a novel apparatus wherein all contact components are dispensable, ranging from economical large capacity cartridges to simple static mixers, with no valves to wear out, no internal parts to clean, and minimal material waste.

Other and further objects will be explained hereinafter and are more particularly delineated in the appended claims.

SUMMARY

In summary, however, from one of its viewpoints, the invention embraces a two-part fluid dispenser apparatus having, in combination, a housing into which a pair of pre-loaded cartridges respectively containing the two fluid parts is received and provided with compressed air-actuated push rod plungers for compressing the fluid parts in the cartridges; a static mixer connected to receive and mix the fluids as they are compressed out of the cartridges; a flexible pinch tube connected to receive the mixed fluids from the static mixer and to dispense the same; and a pinch valve disposed variably to pinch off the pinch tube to control the mixed fluid dispensing.

Preferred and best mode designs and techniques for the practice of the invention are later presented.

DRAWINGS

The invention will now be explained with reference to the accompanying drawings, FIG. 1 of which is a longitudinal sectional view of preferred mixing and dispenser apparatus for the practice of the method underlying the invention; and FIG. 2 is a similar but enlarged view of the preferred fully adjustable pinch valve particularly adapted for use in the novel apparatus of FIG. 1.

DESCRIPTION OF PREFERRED EMBODIMENTS

Figure 1:
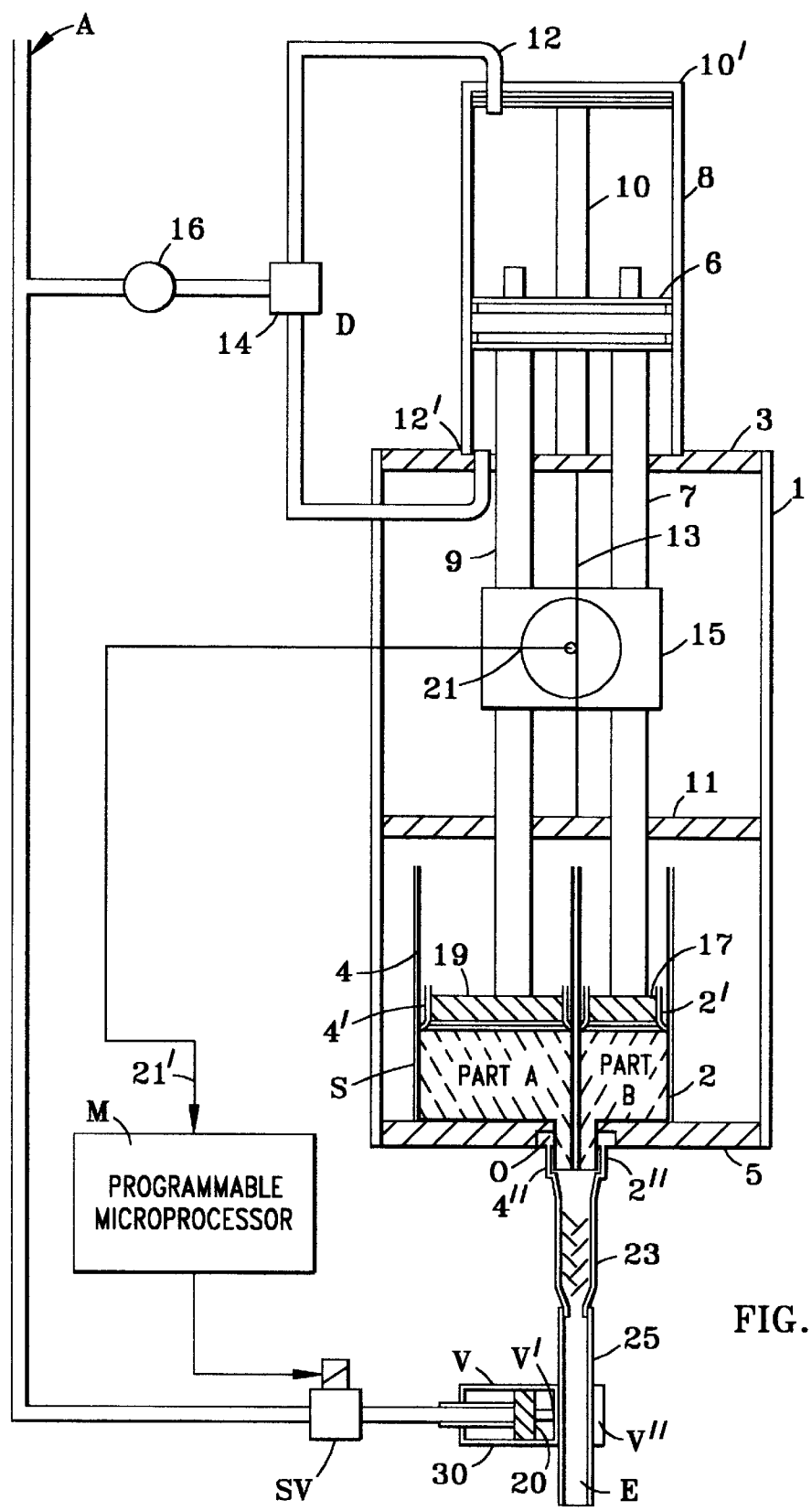

In FIG. 1, the dispenser of the invention is illustrated as a cylinder 1 bounded by top and bottom end plates 3 and 5 and intermediately housing a pair of parallel spaced longitudinally extending push rods 7 and 9 guided through an intermediate planar guide plate connected by an axially extending tension translator cable 13 connected to the inner surface of the top plate 3. The push rods 7 and 9 are held by a push rod brace 15 disposed between the top plate 3 and the guide plate 11 and carrying a rotary encoder 21.

At their lower ends, FIG. 1, the push rods 7 and 9 are terminated in respective push pads 17 and 19, shown for illustrative purposes to demonstrate the wide flexibility of the invention, as of smaller and larger diameters and volumes, respectively, for engaging the respective plungers $2^1$ and $4^1$ of smaller and larger fluid material disposable flexible cartridges 2 and 4 as of plastic, inserted side-by-side and containing respective fluids PART B and PART A therein as fed into openings $2^{11}$ and $4^{11}$, depending centrally through an opening O in the dispenser bottom plate 5, from a later-described static mixer 23. The cartridge 2 and its plunger $2^1$, for example, may be for a 300 cc volume unit, whereas the cartridge 4 and its plunger $4^1$ may be for a 750 cc, volume, inserted side-by-side at the bottom of the dispenser 1, with the push rod 7 centrally engaging the plunger $2^1$ and the pushrod 9 engaging the plunger $4^1$, offset to the right to accommodate the larger cartridge 4.

At their upper ends, the push rods 7 and 9 pass through corresponding openings in the dispenser top plate 3 and terminate on opposite sides of a pneumatic piston 6 disposed within a cylindrical pneumatic cylinder 8 carried on top of the dispenser top plate 3. The pneumatic piston 6 is moved upwardly and downwardly in the cylinder 8 along an axially disposed tye rod 10 secured between the center of the dispenser top plate 3 and a cylinder cap $10^1$ in response to downwardly and upwardly directed compressed air or similar fluid inputs 12 and $12^1$, respectively disposed at the top and bottom of the pneumatic cylinder 8. The air is derived from a compressed air source A through a pressure regulator 16 and a cylinder direction switch 14 as, for example, of the foot-pedal or other type, driving the push rods 7 and 9 simultaneously downwardly to exude the cartridge materials into the static mixer 23 to dispense for use at E under the control and regulation of a pinch valve V having cooperative pressure elements $V^1$ and $V^{11}$ acting upon a flexible pinch tube 25, as of plastic. The pinch valve V, in turn, is operated by the switching action of a solenoid SV under programmable microprocessor control at M, as initiated at $21^1$ from the before-mentioned rotary encoder 21, controlling the compressed air fed from the source A to operate the later-described piston 20 of the pinch valve V, FIGS. 1 and 2.

The mechanism described herein operates in the following manner. The pre-loaded plastic cartridges 2 and 4 are placed in a confining metal sleeve S, such as two sleeve halves, then bolted into place, clampingly securing the cartridges in a rigid side-by-side assembly, and with the metal sleeve very closely fitting the overall cartridge diameter. The plastic tube 25 is attached to the tip of the static mixer 23 and is inserted through the pinch valve mechanism $V^1$—$V^{11}$ which controls the flow of material. Pressure is applied to the air cylinder 8 which then applies a dispensing force through the push pad rods, 7–17 and 8–19.

With the pinch valve V closed, material is unable to flow. This causes the plastic cartridges 2 and 4 to expand against the constraining sleeves S and thereby obtain a controlled and precise dimension. This pressure remains constant during the entire dispensing process, thereby insuring that the correct volume ratio is maintained in the cartridges.

In order to prevent the before-described lead/lag problems, the solid cross brace 15 is used intermediately to hold the two push rods 7 and 9 together to prevent any possibility of lead/lag motion of the rods. The guide plate 11 and the cover or top plate 3 force the push rods to travel straight and take up the bending stresses. The guide plates, as well as the sleeves and bottom plate 5 are bolted to the enclosure 1, combining into a very rigid structure which absorbs bending forces and allows the maintenance of the proper dispensing ratios.

Dispensing is controlled by the opening and closing of the pinch valve V. This can be accomplished either manually or automatically.

In the manual mode, the pinch valve V will be opened and closed by the operator. In the automatic mode, control is implemented by the programmable microprocessor M, receiving an input from the rotary encoder 21 that measures the movement of the push rods 7 and 9, and from that, calculates the dispensed volume. Linear motion is translated to rotary by wrapping the before-mentioned tensioned translator cable 13 around the shaft of the rotary transducer. Once pressure is applied to the system, all the mechanical tolerances are taken up, and this pressure is maintained throughout the dispensing cycle, ensuring constant and even stresses on the dispensing mechanism and thus permitting accurate measurement and control of the dispensed quantities.

Advantage in the use of static mixer 23 is that it is capable of thoroughly mixing materials of highly different viscosities without introducing any air, thus eliminating the need for degassing. and enabling immediate dispensing that greatly improves material flow. This is especially important with urethanes and the like where moisture contained in the air causes chemical bubble formation.

The static mixer shown at 23 is in the form, preferably, of a spiral mixer, such as, for example, that of TAH Company, having a series of left-hand and right-hand helical elements, as shown, that progressively divide and recombine the pumped fluids and provide a uniform output.

Figure 2:
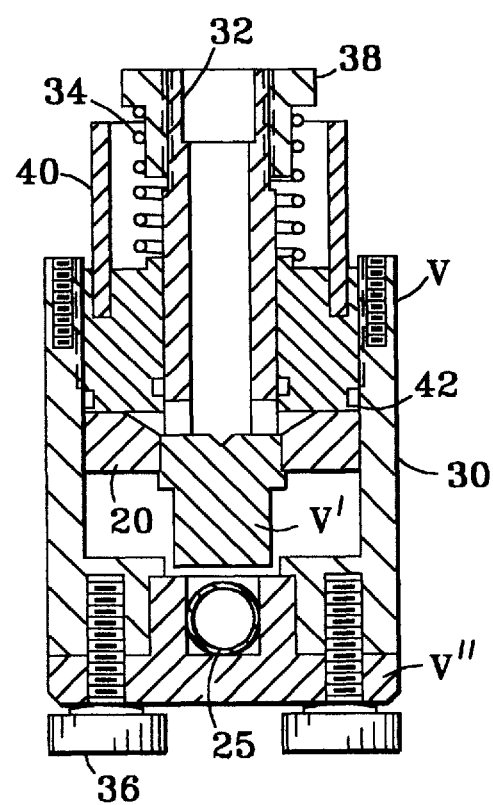

A preferred form of fully adjustable pinch valve mechanism $V-V^1-V^{11}$ is shown in more detail in FIG. 2, having a cylindrical body 30 within which a longitudinally extending pinch rod 32 may drive the piston 20, against the action of a return spring 34, to compress the transversely extending pinch tube 25 between the clamping surface $V^1$ carried by and at the end of the pinch rod, and an opposing tube retainer surface $V^{11}$, before mentioned, to apply the desired and precise degree of control of flow of the mixed fluids from the static mixer 23 as dispensed at E. Retainer thumb screws are shown at 36, a spring closure adjustment nut at 38, and opening adjustment pins at 40 carried in the back plate 42.

The principle of this valve V is that the tube 25 through which material flows is pinched off to stop the flow of material. The pinching action is removed to restore material flow, Adjustment of the opening of the valve permits precise sizing of the open cross sectional area of the tube 25, helping to obtain additional precision in controlling minute amounts of the fluids of low viscosity.

The closing adjustment of the valve provides the precise adjustment needed for the closure force such that it is sufficient to prevent material flow but such that it will not damage the tube. This provides for a long work life that produces thousands of operations before tube replacement is needed.

The tube retainer $V^{11}$ captures the tube 25 extending transversely of the longitudinal pinch rod 25 and keeps it from moving when the tube is pinched. It is normal for the end of the tube to be contaminated with dripping material. If this tube is then pulled out of the pinch valve, the dripping material will contaminate the pinch valve causing it to eventually to malfunction. To prevent this from happening, the retainer $V^{11}$ is made removable, as shown, so as to open the pinch valve for tube removal without contaminating the valve.

Compressed air enters the valve body 30 through the commutation hole in the push rod 32, and the piston 20 is press-fitted onto the pinch rod. The compressed air causes the piston to move forward and pinch off the tube 25. The before-mentioned closure adjustment nut 38 stops the forward motion of the pinch rod when it comes up against the back plate 42 which is threaded into the body 30.

The position of the back plate determines how far the pinch tube 25 is allowed to open. The return spring 34 will move the pinch rod 32 as far back as the backplate 42 will allow when the compressed air is removed.

A typical set of specifications for a successfully constructed apparatus constructed as in FIGS. 1 and 2, is as follows:

| | |
|---|---|
| WORKING PRESSURE | 20–100 PSI |
| MAXIMUM CARTRIDGE VOLUME | 750 CC |
| MAXIMUM DISPENSING VOLUME | 1500 CC |
| DISPENSING RATIOS | 1:1 |
| | 2:1 |
| | 2.5:1 |
| | 4:1 |
| | 5:1 |
| | 10:1 |
| DISPENSING ACCURACY | +/−.25 CC |
| FLOW CONTROL | PINCH VALVE |
| PINCH VALVE SPECIFICATIONS: | |
| MINIMUM PRESSURE | 20 PSI |
| MAXIMUM PRESSURE | 100 PSI |
| MAXIMUM TUBE DIAMETER | ⅜ INCH |
| PINCH STOP ADJUSTABLE TO MATCH DISPENSING TUBE | |

In the computer-controlled mode of operation, once the operator has programmed a volume to be dispensed, the system allows the correct dispensed deposit with each depression of the foot pedal or other switch 14, as previously described.

For a semi-automatic single shot mode, the dispensing occurs for so long as the foot pedal or other type switch is pressed. The total amount of mixed fluid dispensed may be indicated on a commercial display, schematically represented at D, resettable back to zero between deposits.

In a semi-automatic cumulative mode, on the hand, the operation is similar to the before-described manual mode, but the display does not reset with each deposit, thus registering a cumulative total.

Further modifications will also occur to those skilled in this art, and such are considered to fall within the spirit and scope of the invention as defined in the appended claims.

What is claimed is:

1. A method of dispensing two-part fluids of similar and different viscosities contained within respective flexible cartridges that comprises, fitting the cartridges side-by-side within a confining sleeve; simultaneously compressing the fluids in the cartridges in response to compressed air and into a common outlet; receiving the fluids at the outlet and statically mixing them; feeding the mixed fluids to and along a flexible pinch tube in varying degrees to control the dispensing, such that with tube pinched off, the cartridges and the respective fluids therein expand against the confining sleeve to a controlled and precise volume establishing a constant pressure during the entire dispensing, thereby insuring the correct volume ratio of the fluids in the cartridges; and varying the compressed air pressure and the dispensing ratios as desired.

2. A method as claimed in claimed 1 and in which the dispensing is selectively effected in each of manual, automatic and semi-automatic modes by respectively switching the compressed air in response to programmed microprocessor control, and applying the compressor air for so long as the switching remains in one position.

3. A two-part fluid dispenser apparatus having, in combination, a housing into which a pair of pre-loaded cartridges respectively containing the two fluid parts is received and provided with compressed air-activated push rod plungers for compressing the fluid parts in the cartridges; a static mixer connected to receive and mix the fluids as they are compressed out of the cartridge; a flexible pinch tube connected to receive the mixed fluids from the static mixer and to dispense the same; and a pinch valve having means disposed variably to pinch off the pinch tube to control the mixed fluid dispensing.

4. Dispenser apparatus as claimed in claim 3 and in which means is provided for varying the pressure of the air compression.

5. Dispenser apparatus as claimed in claim 3 and in which the cartridges are of flexible material, and are bound side-by-side within a metal sleeve clamped thereabout after insertion within the housing.

6. Dispenser apparatus as claimed in claim 5 and in which the cartridges are each provided with bottom openings inputting the static mixer therebelow.

7. Dispenser apparatus as claimed in claim 3 and in which the viscosities of the two fluid parts are different.

8. Dispenser apparatus as claimed in claim 7 and in which the pressure is adjustable within the limits of substantially 20 to 100 PSI.

9. Dispenser apparatus as claimed in claim 3 and in which the cartridges are of different volumes.

10. Dispenser apparatus as claimed in claim 9 and in which means is provided for varying the dispensing ratios of the fluids.

11. Dispenser apparatus as claimed in claim 10 and in which the dispensing ratios are from substantially 1:1 to 10:1.

12. Dispenser apparatus as claimed in claim 3 and in which the push rods extend parallelly longitudinally within the housing through the top thereof, and are there connected with a pneumatic piston movable within a compressed air cylinder disposed on top of the housing and having compressed air inputs above and below the pneumatic piston.

13. Dispenser apparatus as claimed in claim 12, and in which a switch is provided for applying compressed air selectively to said inputs.

14. Dispenser apparatus as claimed in claim 13 and in which the pinch valve is operated by the compressed air to effect closing off and opening of the pinch tube under switch control.

15. Dispenser apparatus as claimed in claim 14 and in which the switch control is a solenoid actuable by a programmable microprocessor receiving an electrical input corresponding to the degree of longitudinal movement of the push rods within the housing.

16. Dispenser apparatus as claimed in claim 15 and in which said electrical input is derived from rotary encoder cooperating with a tensioned translator cable and carried by the push rods.

17. A two-part fluid dispenser apparatus having, in combination, a housing into which a pair of pre-loaded plastic cartridges respectively containing the two fluid parts is received, the housing being provided with push rod plungers for simultaneously compressing the fluid parts in the cartridges; a confining surface externally embracing both cartridges for holding the cartridges against distortion during the fluid compressing; and a static mixer connected to receive and mix the fluids as they are compressed out of the cartridges.

18. Dispenser apparatus as claimed in claim 17 and in which means is provided for moving the push rods plungers downwardly and upwardly parallely longitudinally within the housing and with transverse brace means keeping the push rods moving longitudinally parallely and in unison.

19. Dispenser apparatus as claimed in claim 17 and in which means is provided to exert downward force at one of the ends of the push-rod plungers to drive them into compressing engagement at their other ends with the fluid in the cartridges.

20. Dispenser apparatus as claimed in claim 19 and in which the force-exerting means, following the completion of compressing of the fluids into the static mixer by the push-rod plungers, is operable through means for retracting the push-rod plungers back upwardly in the housing to permit withdrawal of the empty cartridges therefrom.

21. A two-part fluid dispenser apparatus having, in combination, a housing into which a pair of pre-loaded flexible plastic cartridges respectively containing the two fluid parts is received, the housing being provided with push rod plungers for simultaneously compressing the fluid parts in the cartridges; a two-part sleeve for receiving the pair of cartridges and then clampingly securing the pair of cartridges together in side-by-side rigid assembly, with the sleeve closely fitting and constraining the flexible plastic cartridge expansion against the sleeve, such that the pressure by the push rod plungers throughout their compressing of the fluid parts in the cartridges remains constant; and a static mixer connected to receive and mix the fluids as they are compressed out of the cartridges.

22. Dispenser apparatus as claimed in claim 21 wherein the two-part fluids are of different viscosities and are contained within cartridges of different volumes.

* * * * *